Patented Feb. 21, 1939

2,147,985

UNITED STATES PATENT OFFICE 2,147,985

PROCESS FOR PREPARING A CATALYTIC MATERIAL

Paul V. McKinney, Bartlesville, Okla., assignor to Phillips' Petroleum Company, a corporation of Delaware No Drawing. Application June 29, 1936, Serial No. 88,062

4 Claims. (Cl. 196—10)

This invention relates to the preparation of a catalytic material which is effective in the polymerization of olefins, and which has a particularly long life time of activity.

The object of this invention is to prepare a type of material similar to the natural clays, that is a synthetic catalyst, such as aluminum silicate.

A further object is to produce a catalyst of high activity and long life for the polymerization of olefins.

Still another object of this invention is to produce an activated aluminum silicate.

Hard vitreous silica gel has become well known as a supporting material for catalysts. In preparing the silicic acid gel used as a catalyst support, it has been customary to mix a hydrochloric acid solution with a solution of water glass to precipitate the gel. The other mineral acids and acetic acid have been mentioned for this purpose, but in general have not been used. I have found that if phosphoric acid is used to precipitate or set the gel, a different pore structure having different physical characteristics results. For example, on allowing the gel to set as hereinafter described it is opaque and milky, rather than clear and translucent as is the case with the gels precipitated by use of hydrochloric acid. I have furthermore found that when this material is activated by aluminum salt solution, in a manner to be described, a material having exceedingly desirable properties as a catalyst is formed. The supported synthetic aluminum silicate of gel type prepared in this manner is not only more active in the polymerization of normally gaseous olefins, but maintains its catalytic activity much longer than preparations made with the aid of the other precipitating acids mentioned.

Many methods have been proposed for the activation of silica gel, and for the formation of active catalytic material supported upon silica gel. Activation for catalytic reaction may be conveniently obtained by applying solutions of suitable compounds, which coat and impregnate the gel with catalytically active materials or produce catalytically active surfaces by chemically modifying gel surfaces. I may thus activate the gel while in the fresh hydrous condition or in the hard vitreous dried form. However my preferred method is to dry the gel to a predetermined extent before washing as is taught in my copending application, Serial No. 78,056 filed May 5, 1936 for a Method and process for preparing a catalytic material. In this state the gel is still a moderately hydrous silica, and it is not in the final dried form. It possesses some rigidity and is easily handled mechanically and is readily washed free of ionic material. At the same time the gel is still in a reactive and pervious form so that it is readily activated by solution treatment as described.

In the first place a silicic acid gel is prepared by mixing a solution of a silicate with a dilute solution of phosphoric acid. Specifically a satisfactory silicic acid gel may be prepared by diluting a sodium or potassium silicate solution with water and pouring the same into a dilute solution of phosphoric acid while accompanied by stirring. This mixture of a silicate solution with phosphoric acid will set to a gel in a short time, the length of which depends on the strength of the acid solution and the relative volume of the two solutions used. Although a wide range of concentration is permissible, it is convenient to use a volume of dilute phosphoric acid solution equal to the volume of the dilute water glass solution used. Therefore the syrupy phosphoric acid of commerce may in the best practice of my invention be diluted with water in the ratios between 1:7 and 1:12, the alkali silicate being present preferably in less than the chemically equivalent amount, so that the resultant mixture is more or less acid. After the gel has been allowed to set, it is cut or broken into pieces and rinsed, to remove therefrom the excess salt and acid.

Several methods of preparing this gel for activation are possible. It may be completely washed with water to free it of ionic material and then activated while wet, or it may be dried after the washing and then activated in the form of a hard vitreous material. However, it is my preference to proceed in the following manner. The gel is rinsed free of excess salt and is partially dried, until its water content has been reduced between 45% and 55% by weight, and preferably to 50%. This semi-dried gel is easily washed free of salt and acid by means of water. In some cases when a dilute phosphoric acid is used to precipitate the silicic acid gel washing of the resultant gel may be unnecessary. The gel may then be activated while in either wet form, dry form, or semi-dry form by treating the same with a metallic salt solution. The activation of the gel, while in any of the desired forms above taught, may be effected by a metallic salt solution accompanied with heating, or the gel may be allowed to merely soak in the metallic salt solution for a period of time sufficient to accomplish the same activation realized by heating. Aluminum salts impart catalytic activity for the olefin polymerization reaction and any water soluble aluminum salt is suitable for the activating operation.

In a specific instance the hydrous gel is covered with 0.1 molar aqueous solution of an aluminum salt and either soaked overnight or heated to the boiling temperature for an hour. Following this activating treatment the gel is thoroughly washed with water to remove the soluble material and is then dried. Shrinking and hardening take place on drying and the catalyst in dried form may be used to effect catalytic reaction.

The data of the following example illustrates the improvement in the activity of the catalyst prepared as taught in the foregoing instance over that produced by using hydrochloric acid as the acid agent for preparing the gel in an otherwise identical preparative procedure. For this test propylene gas at one atmosphere pressure and at the rate of one liter per gram catalyst per hour was passed over the catalyst, while maintaining a reaction temperature of 335° C. The yield of liquid polymer per hour for the two types of catalyst and after various times is given in the table. As the results indicate the present catalyst is more active and also maintains its activity longer than with a catalyst prepared by the methods of the prior art.

TABLE I.—CATALYST ACTIVITY

Yield of liquid polymer in cc. from propylene at 1 liter per hour per gram catalyst at one atmosphere

| Time of test | Gel set by HCl | Gel set by $H_3PO_4$ |
|---|---|---|
| 1st hour | 1.7 | 2.6 |
| 5th hour | 1.8 | 2.5 |
| 10th hour | 1.8 | 2.0 |
| 15th hour | 1.5 | 1.7 |
| 20th hour | 1.2 | 1.6 |
| 25th hour | 0.8 | 1.5 |
| 30th hour | 0.5 | 1.4 |

I claim:

1. A process for converting normally gaseous olefins to higher molecular weight hydrocarbons which comprises passing said olefins under polymerization conditions of temperature and pressure over a catalyst comprising a silica gel activated with an aluminum salt prepared by the action of aqueous phosphoric acid upon a water soluble silicate, washing the gel free of soluble material, activating the washed gel with an aluminum salt solution, and subsequently drying said activated silica gel.

2. A process for converting normally gaseous olefins to higher molecular weight hydrocarbons which comprises passing said olefins under polymerizing conditions of temperature and pressure over a catalyst comprising a silica gel activated by an aluminum salt, said catalyst being characterized by its method of preparation which comprises preparing gelatinous silica by reacting a soluble silicate with aqueous phosphoric acid, washing the gel to remove soluble impurities, treating the washed gel with a solution of an aluminum salt to activate the same, washing the activated gel and subsequently drying it.

3. A process for converting normally gaseous olefins to higher molecular weight hydrocarbons which comprises passing said olefins under polymerizing conditions of temperature and pressure over a catalyst comprising a silica gel activated by an aluminum salt characterized by its method of preparation which comprises preparing gelatinous silica by the reaction of aqueous sodium silicate and aqueous phosphoric acid, washing the gel to remove soluble impurities, treating the washed gel with a solution of an aluminum salt to activate the same, washing the activated gel and subsequently drying it.

4. A process for converting normally gaseous olefin hydrocarbons to higher molecular weight products which comprises passing said olefins under polymerizing conditions of temperature and pressure over a catalyst comprising a silica gel activated by an aluminum salt characterized by its method of preparation which comprises preparing gelatinous silica by the reaction of a soluble silicate and aqueous phosphoric acid, partially drying said silica gel until it has a water content between 45 and 55 per cent by weight, washing said partially dried gel until it is substantially free of ionic material, treating said washed gel with an aqueous solution of an aluminum salt having a concentration of about 0.1 molar to activate the same, and subsequently washing and drying said activated silica gel.

PAUL V. McKINNEY.